(12) United States Patent
Lin (10) Patent No.: US 7,760,280 B2
(45) Date of Patent: Jul. 20, 2010

(54) THIN FILM TRANSISTOR ARRAY SUBSTRATE AND METHOD FOR MANUFACTURING SAME

(75) Inventor: Yao-Nan Lin, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 332 days.

(21) Appl. No.: 11/788,164

(22) Filed: Apr. 19, 2007

(65) Prior Publication Data
US 2007/0247558 A1    Oct. 25, 2007

(30) Foreign Application Priority Data
Apr. 19, 2006    (CN)    .................. 2006 1 0060390

(51) Int. Cl.
G02F 1/136    (2006.01)
H01L 31/00    (2006.01)
H01L 21/00    (2006.01)

(52) U.S. Cl. .................. 349/43; 349/139; 349/187; 257/59; 438/30; 438/149

(58) Field of Classification Search .................. None
See application file for complete search history.

(56) References Cited

U.S. PATENT DOCUMENTS

| | | | |
|---|---|---|---|
| 5,054,887 A * | 10/1991 | Kato et al. ................ | 349/42 |
| 6,956,626 B2 | 10/2005 | Tseng | |
| 2004/0084678 A1 | 5/2004 | Peng et al. | |
| 2005/0054146 A1 * | 3/2005 | Chen et al. ................ | 438/158 |
| 2005/0170290 A1 | 8/2005 | Dejima | |
| 2005/0227395 A1 * | 10/2005 | Jeoung et al. ............. | 438/30 |
| 2006/0003479 A1 * | 1/2006 | Park et al. ................ | 438/30 |
| 2006/0033109 A1 * | 2/2006 | Park .......................... | 257/72 |
| 2006/0125990 A1 * | 6/2006 | Lee et al. ................... | 349/141 |

FOREIGN PATENT DOCUMENTS

CN    1648747 A    8/2005

* cited by examiner

Primary Examiner—Michelle R Connelly Cushwa
(74) Attorney, Agent, or Firm—Wei Te Chung (57) ABSTRACT

An exemplary method for manufacturing a TFT array substrate (20) typically for use in a liquid crystal display (LCD) includes: providing an insulating substrate (30) comprising a TFT area (31), a display area (32) and a capacitor area (33); forming a gate electrode (232) at the TFT area and a capacitor electrode (222) at the capacitor area; forming an insulating layer (203), an amorphous silicon layer (204), and a doped amorphous silicon layer (205) in turn on the insulating substrate; etching the doped amorphous silicon, the amorphous silicon and the insulating layer at the display area and the capacitor area; forming a source electrode (231) and a drain electrode (233) at the TFT area; forming a passivation layer (225) at the capacitor area; and forming a pixel electrode (221) on the substrate, the pixel electrode covering the display area, the capacitor area, and part of the TFT area.

15 Claims, 7 Drawing Sheets

THIN FILM TRANSISTOR ARRAY SUBSTRATE AND METHOD FOR MANUFACTURING SAME

FIELD OF THE INVENTION

This invention relates to transistor (TFT) array substrates typically used in liquid crystal displays (LCDs) and methods for manufacturing TFT array substrates, and particularly to a TFT array substrate which has a capacitor with a large capacitance and a method for manufacturing the TFT array substrate.

GENERAL BACKGROUND

An LCD has the advantages of portability, low power consumption, and low radiation, and has been widely used in various portable information products such as notebooks, personal digital assistants (PDAs), video cameras and the like. Furthermore, the LCD is considered by many to have the potential to completely replace CRT (cathode ray tube) monitors and televisions.

An LCD generally includes a color filter substrate, a TFT array substrate, and a liquid crystal layer sandwiched between the two substrates. When an LCD works, an electric field is applied to liquid crystal molecules in each of selected pixel regions of the liquid crystal layer. In these pixel regions, the liquid crystal molecules change their orientations. Thereby, the liquid crystal layer provides anisotropic transmittance of light therethrough. Thus the amount of the light penetrating the color filter substrate at each of the selected pixel regions is adjusted by controlling the strength of the electric field. In this way, desired pixel colors are obtained at the color filter substrate, and the arrayed combination of the pixel colors provides an image viewed on a display screen of the LCD.

Figure 13:
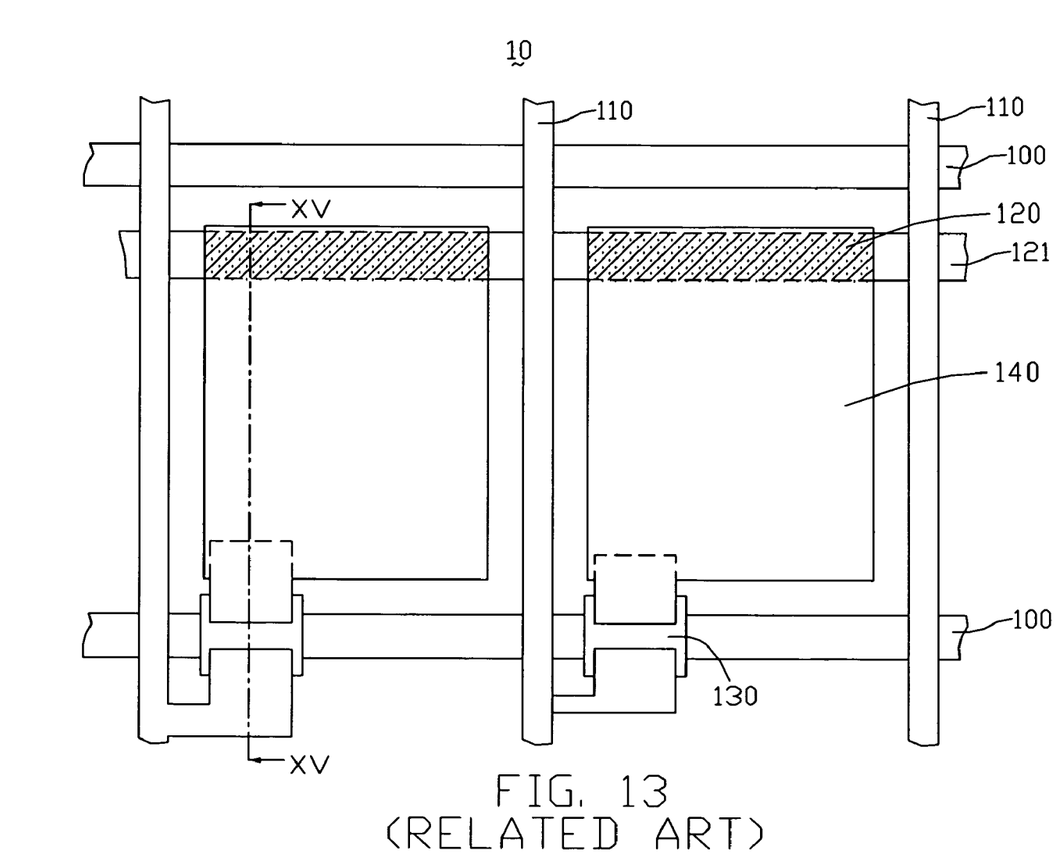
FIG. 13 is a schematic, top plan view showing structure of part of a conventional TFT array substrate.

FIG. 13 is a schematic, top plan view showing structure of part of a typical TFT array substrate. The TFT array substrate 10 includes a plurality of gate lines 100 that are parallel to each other and that each extend along a first direction, and a plurality of data lines 110 that are parallel to each other and that each extend along a second direction orthogonal to the first direction. The smallest rectangular area formed by any two adjacent gate lines 100 together with any two adjacent data lines 110 defines a pixel region thereat. In each pixel region, a TFT 130 is provided in the vicinity of a respective point of intersection of one of the gate lines 100 and one of the data lines 110. A pixel electrode 140 is connected to the TFT 130. A capacitor electrode 121 parallel to the gate lines 100 underlies part of the pixel electrode 140 to form a storage capacitor 120.

Figure 14:
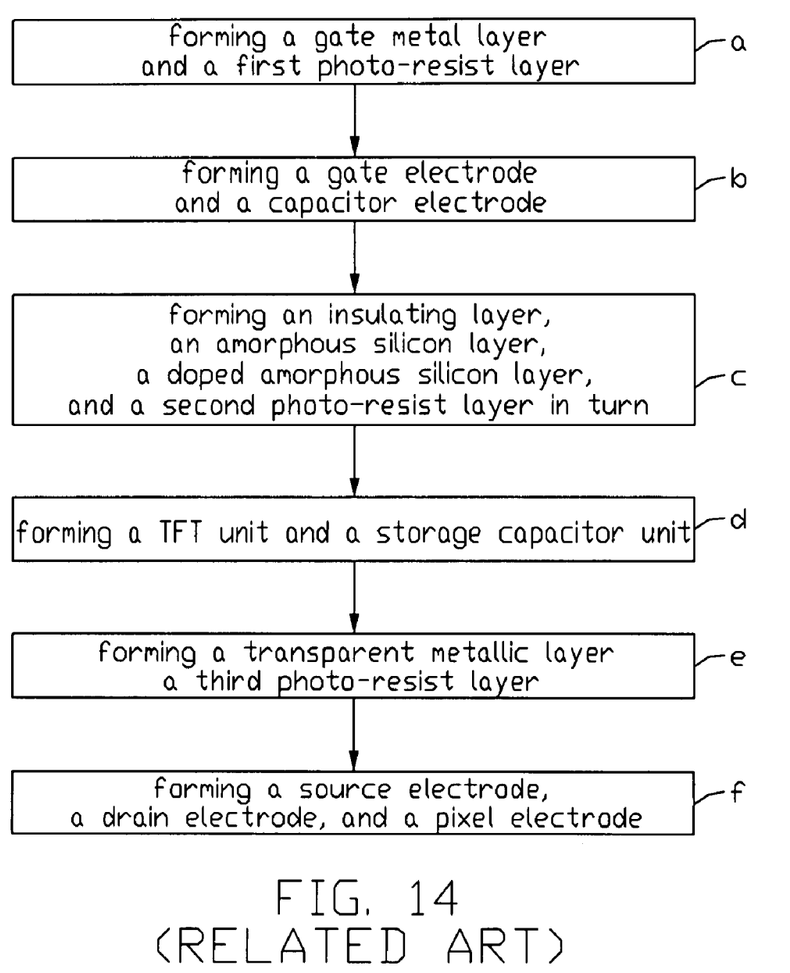
FIG. 14 is a flowchart summarizing a conventional method for manufacturing the TFT array substrate of FIG. 13.

FIG. 14 is a flowchart summarizing a typical method for manufacturing the TFT array substrate 10. The method mainly includes the following steps, which are for convenience described in relation to a single pixel region only:

step a: forming a gate metal layer and a first photo-resist layer;
step b: forming a gate electrode and a capacitor electrode;
step c: forming an insulating layer, an amorphous silicon layer, a doped amorphous silicon layer, a source/drain metal layer, and a second photo-resist layer in turn;
step d: forming a TFT unit and a storage capacitor;
step e: forming a transparent metallic layer and a third photo-resist layer; and
step f: forming a source electrode, a drain electrode, and a pixel electrode.

Figure 15:
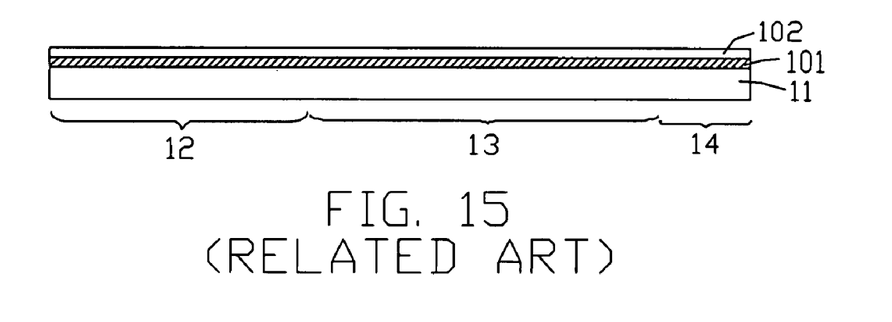
FIG. 15 through FIG. 19 are schematic, side cross-sectional views corresponding to line XV-XV of the TFT array substrate of FIG. 13, each of FIGS. 15-19 relating to at least one of manufacturing steps of the method of FIG. 14.

FIG. 15 through FIG. 19 are schematic, side cross-sectional views corresponding to line XV-XV of the TFT array substrate 10 of FIG. 13, with each of FIGS. 15-19 relating to at least one of manufacturing steps of the method of FIG. 14. The manufacturing steps are described in details as follows:

In step 1, referring to FIG. 15, an insulating substrate 11 having a TFT area 12, a display area 13, and a capacitor area 14 is provided. A gate metal layer 101 is deposited on the transparent substrate 11, then a first photo-resist layer 102 is deposited on the gate metal layer 101.

Figure 16:
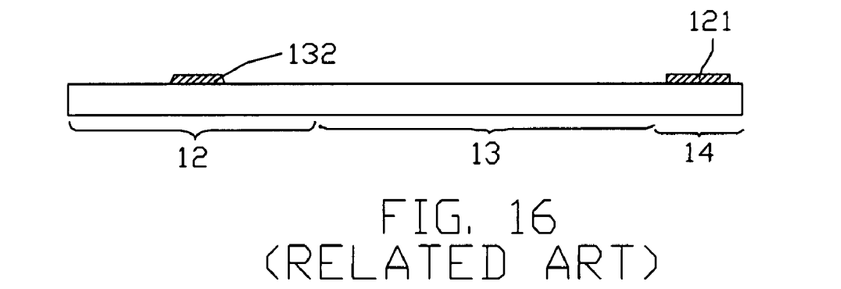

In step 2, referring also to FIG. 16, the first photo-resist layer 102 is exposed using a first photo mask (not shown), and then is developed. Thereby, a first photo-resist pattern is formed. The gate metal layer 101 is etched according to the first photo-resist pattern, thereby forming a gate electrode 132 and a capacitor electrode 121. Thus, the gate electrode 132 positioned at the TFT area 12 and the first capacitor electrode 121 positioned at the capacitor area 14 are formed by a first photolithographic process.

Figure 17:
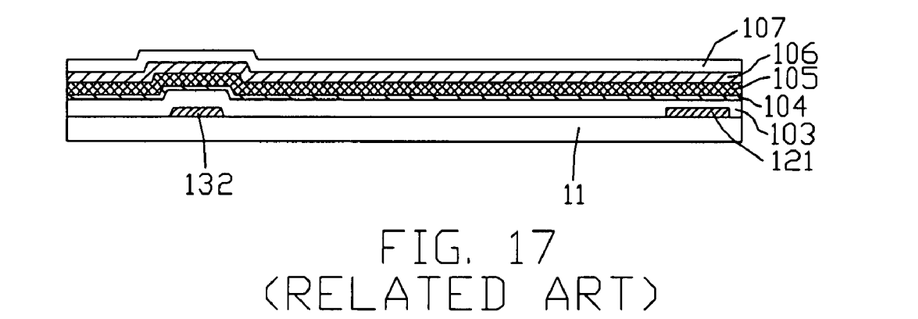

In step 3, referring also to FIG. 17, a gate insulating layer 103, an amorphous silicon layer 104, a doped amorphous silicon layer 105, a source/drain metal layer 106, and a second photo-resist layer 107 are sequentially formed on the insulating substrate 11 having the gate electrode 132 and the first capacitor electrode 121 formed thereon.

Figure 18:
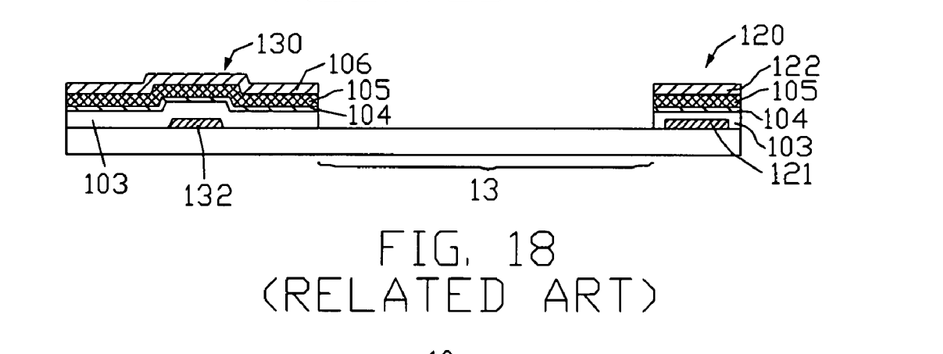

In step 4, referring also to FIG. 18, the second photo-resist layer 107 is exposed using a second photo mask (not shown), and then is developed. Thereby, a second photo-resist pattern is formed. The source/drain metal layer 106, the doped amorphous silicon layer 105, the amorphous silicon layer 104, and the gate insulating layer 103 at the display area 13 are etched according to the second photo-resist pattern, thereby forming a TFT unit 130 and a storage capacitor 120. The storage capacitor 120 includes the first capacitor electrode 121, a second capacitor electrode 122, and the doped amorphous silicon layer 105, the amorphous silicon layer 104 and the gate insulating layer 103 sandwiched between the two electrodes 121, 122. The TFT unit 130 includes the gate electrode 132, the gate insulating layer 103, the amorphous silicon layer 104, the doped amorphous silicon layer 105, and the source/drain metal layer 106. Thus, the TFT unit 130 and the storage capacitor 120 are formed by a second photolithographic process which includes step 3 and step 4.

Figure 19:
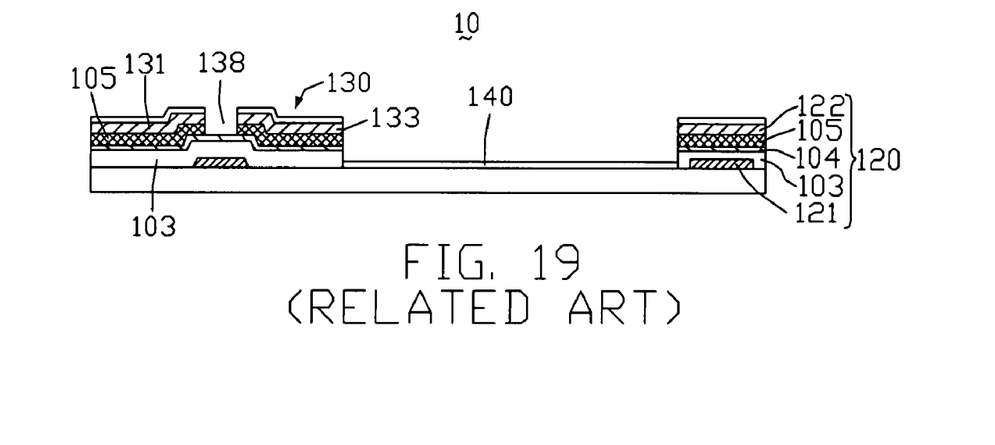

In steps 5 and 6, referring also to FIG. 19, a transparent metallic layer (not shown) and a third photo-resist layer (not shown) are formed on the insulating substrate 11 having the TFT unit 130 and the storage capacitor 120 formed thereon. The transparent metallic layer can for example be made of ITO (Indium-Tin Oxide) or IZO (Indium-Zinc Oxide). The third photo-resist layer is exposed and then is developed, thereby forming a third photo-resist pattern. The transparent metallic layer is etched according to the third photo-resist pattern, thereby forming a pixel electrode 140. The source/drain metal layer 106 is etched, thereby forming a source electrode 131 and a drain electrode 133 of the TFT 130. Furthermore, a portion of the doped amorphous silicon layer 105 below a gap between the source and drain electrodes 131, 133 is etched by a wet etching method. Thereby, a groove 138 is commonly defined in the gap between the source and drain electrodes 131, 133 and the doped amorphous silicon layer 105. Thus, the completed TFT array substrate 10 is finally obtained by a third photolithographic process which includes step 5 and step 6.

A capacitance $C_{ST}$ of the storage capacitor 120 can be calculated according to the following formula:

$$C_{sr} = \frac{\varepsilon \cdot A}{d}$$

In the formula, "∈" represents a dielectric constant of the insulation layers between the first capacitor electrode 121 and the second capacitor electrode 122. "A" represents an area of the first capacitor electrode 121 opposite to the second capacitor electrode 122. "d" represents a distance between the first capacitor electrode 121 and the second capacitor electrode 122, and is equal to a combined thickness of an overlying portion of the gate insulating layer 103, the amorphous silicon layer 104, and the doped amorphous silicon layer 105. According to the above formula, a capacitance of the storage capacitor 120 is proportional to the electrode area "A", and is inversely proportional to the distance "d".

In order to improve the display quality of an LCD having the TFT array substrate 10, a capacitance of the storage capacitor 120 needs to be high. However, it is difficult to reduce the distance "d" between the first capacitor electrode 121 and the second capacitor electrode 122 of the storage capacitor 120, because the thickness of the gate insulating layer 103 of the TFT unit 130 must be kept at or above a minimum predetermined threshold thickness. On the other hand, if the electrode area "A" is increased to increase the capacitance of the storage capacitor 120, the aperture ratio of the TFT array substrate 10 is reduced. The reduced aperture ratio may diminish the display quality of the LCD.

What is needed, therefore, is a method for manufacturing a TFT array substrate of an LCD that can overcome the above-described deficiencies. What is also needed is a TFT array substrate made according to the above method.

SUMMARY

In one preferred embodiment, a method for manufacturing a TFT array substrate of an LCD includes: providing an insulating substrate comprising a TFT area, a display area and a capacitor area; forming a gate electrode at the TFT area and a capacitor electrode at the capacitor area through a first photolithographic process; forming an insulating layer, an amorphous silicon layer, and a doped amorphous silicon layer in turn on the insulating substrate; etching the doped amorphous silicon, the amorphous silicon and the insulating layer at the display area and the capacitor area through a second photolithographic process; forming a source electrode and a drain electrode at the TFT area through a third photolithographic process; forming a passivation layer at the capacitor area through a fourth photolithographic process; and forming a pixel electrode on the substrate through a five photolithographic process, the pixel electrode covering the display area, the capacitor area, and part of the TFT area, the capacitor electrode, the pixel electrode and the passivation layer between the two electrodes cooperatively defining a capacitor.

Other novel features and advantages will become more apparent from the following detailed description when taken in conjunction with the accompanying drawings.

DETAILED DESCRIPTION OF PREFERRED EMBODIMENTS

Figure 1:
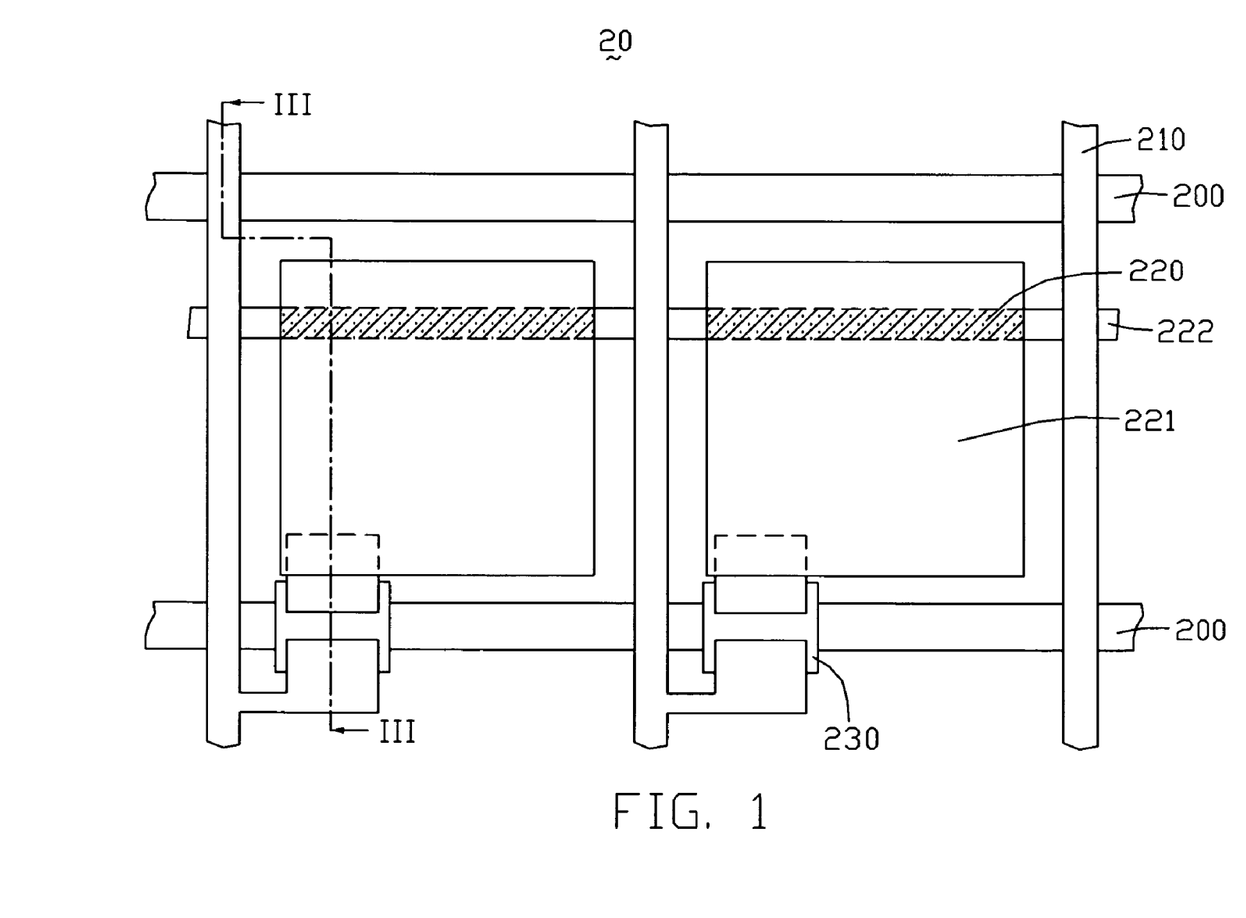
FIG. 1 is a schematic, top plan view showing structure of part of a TFT array substrate according to an exemplary embodiment of the present invention.

FIG. 1 is a schematic, top plan view showing structure of a TFT array substrate according to an exemplary embodiment of the present invention. The TFT array substrate 20 includes a plurality of gate lines 200 that are parallel to each other and that each extend along a first direction, and a plurality of data lines 210 that are parallel to each other and that each extend along a second direction orthogonal to the first direction. The smallest rectangular area formed by any two adjacent gate lines 200 together with any two adjacent data lines 210 defines a pixel region thereat. In each pixel region, a TFT 230 is provided in the vicinity of a respective point of intersection of one of the gate lines 200 and one of the data lines 210. A pixel electrode 221 is connected to the TFT 230. A capacitor electrode 222 parallel to the gate lines 200 underlies part of the pixel electrode 221 to form a storage capacitor 220.

Figure 2:
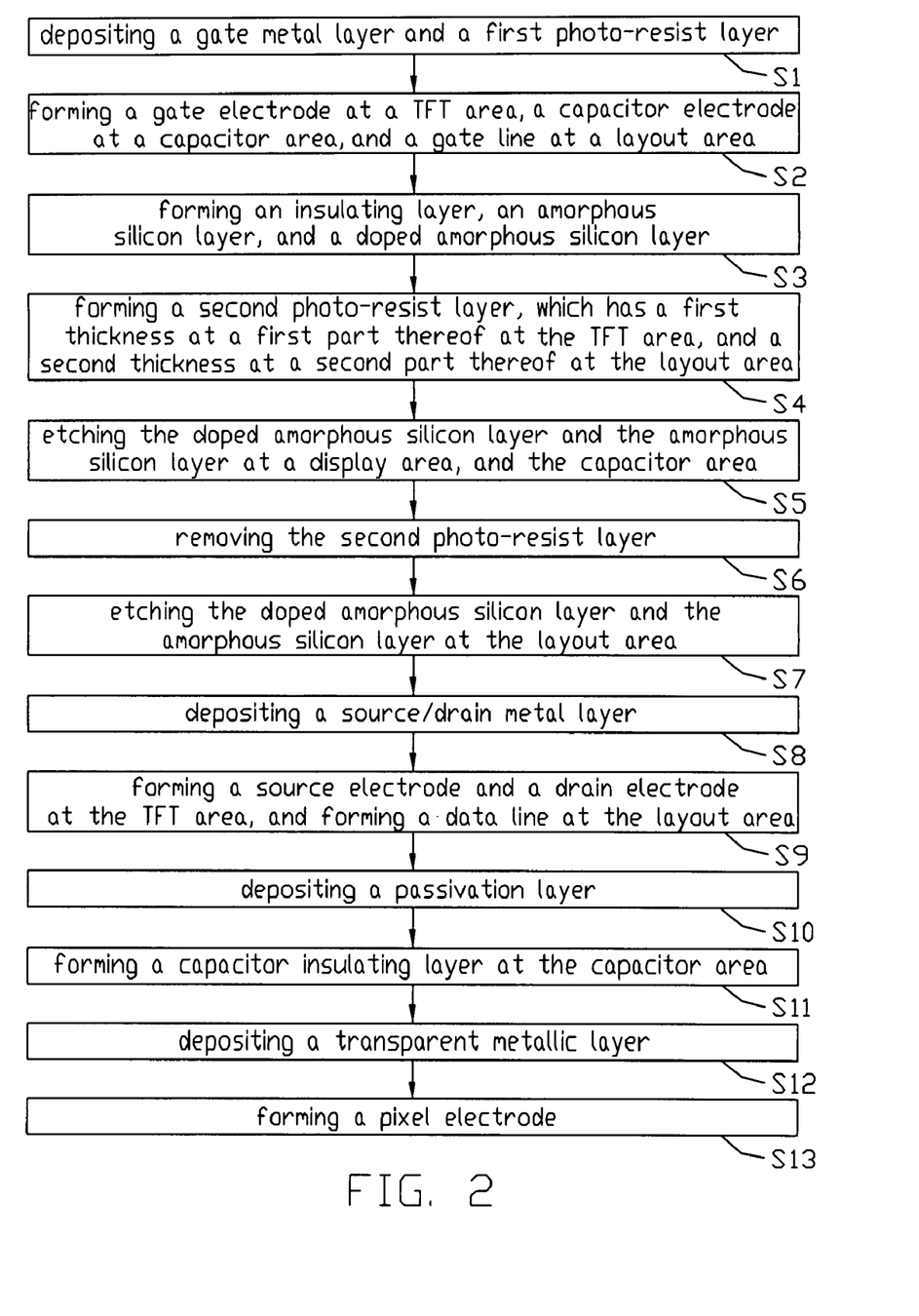
FIG. 2 is a flowchart summarizing an exemplary method for manufacturing the TFT array substrate of FIG. 1.

FIG. 2 is a flowchart summarizing an exemplary method for manufacturing the TFT array substrate 20. The method mainly includes the following steps, which are for convenience described in relation to a single pixel region only:

step S1: depositing a gate metal layer and a first photo-resist layer;

step S2: forming a gate electrode at a TFT area, a capacitor electrode at a capacitor area, and a gate line at a layout area;

step S3: forming an insulating layer, an amorphous silicon layer, and a doped amorphous silicon layer;

step S4: forming a second photo-resist layer, which has a first thickness at a first part thereof at the TFT area and a second thickness at a second part thereof at the layout area;

step S5: etching the doped amorphous silicon layer and the amorphous silicon layer at a display area and the capacitor area;

step S6: removing the second photo-resist layer;

step S7: etching the doped amorphous silicon layer and the amorphous silicon layer at the layout area;

step S8: depositing a source/drain metal layer;

step S9: forming a source electrode and a drain electrode at the TFT area, and forming a data line at the layout area;

step S10: depositing a passivation layer;

step S11: forming a capacitor insulating layer at the capacitor area;

step S12: depositing a transparent metallic layer; and step S13: forming a pixel electrode.

FIG. 3 through FIG. 12 are schematic, side cross-sectional views corresponding to line III-III of the TFT array substrate 20 of FIG. 1, each of FIGS. 3-12 relating to at least one of manufacturing steps of the method of FIG. 2. The manufacturing steps are described in details as follows.

Figure 3:
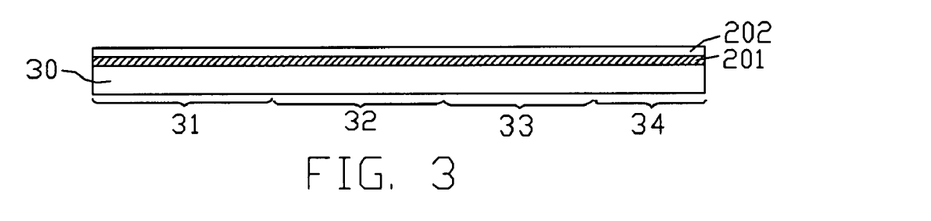
FIG. 3 through FIG. 12 are schematic, side cross-sectional views corresponding to line III-III of the TFT array substrate of FIG. 1, with each of FIGS. 3-12 relating to at least one of manufacturing steps of the method of FIG. 2.

In step 1, referring to FIG. 3, an insulating substrate 30 having a TFT area 31, a display area 32, a capacitor area 33, and a layout area 34 is provided. A gate metal layer 201 is deposited on the insulating substrate 30. A first photo-resist layer 202 is formed on the gate metal layer 202. The insulating substrate 30 can be a transparent substrate such as a glass substrate.

Figure 4:
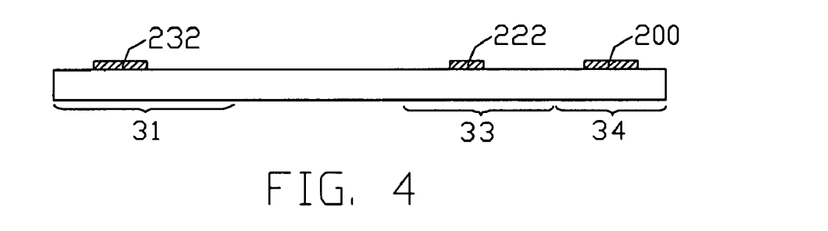

In step 2, referring also to FIG. 4, the first photo-resist layer 202 is exposed, and then is developed. Thereby, a first photo-resist pattern is formed. The gate metal layer 201 is etched according to the first photo-resist pattern, thereby forming a gate electrode 232, a capacitor electrode 222 and a gate line 200. Residual portions of the first photo-resist layer 202 are removed. Thus, the gate electrode 232 positioned at the TFT area 31, the gate line 200 positioned at the layout area 34, and the capacitor electrode 222 positioned at the capacitor area 33 are formed by a first photolithographic process.

Figure 5:
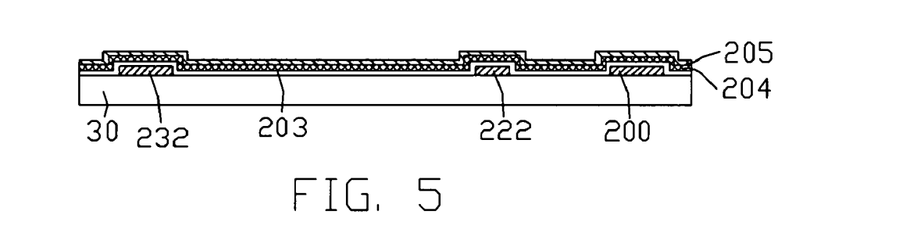

In step S3, referring also to FIG. 5, a gate insulation layer 203 is deposited on the substrate 30 by a chemical vapor deposition (CVD) method, wherein reaction gases are silicon alkyl ($SiH_4$) and ammonia ($NH_3$). An amorphous silicon layer 204 is deposited on the gate insulation layer 203 by a CVD method, wherein reaction gases are silicon chloride and hydrogen. A doped amorphous silicon layer 205 is formed on the amorphous silicon layer 204 by an impurity doping technology method. A second photo-resist layer (not shown) is formed on the doped amorphous silicon layer 205. The gate insulation layer 203 may be made of silicon nitride ($Si_3N_4$).

Figure 6:
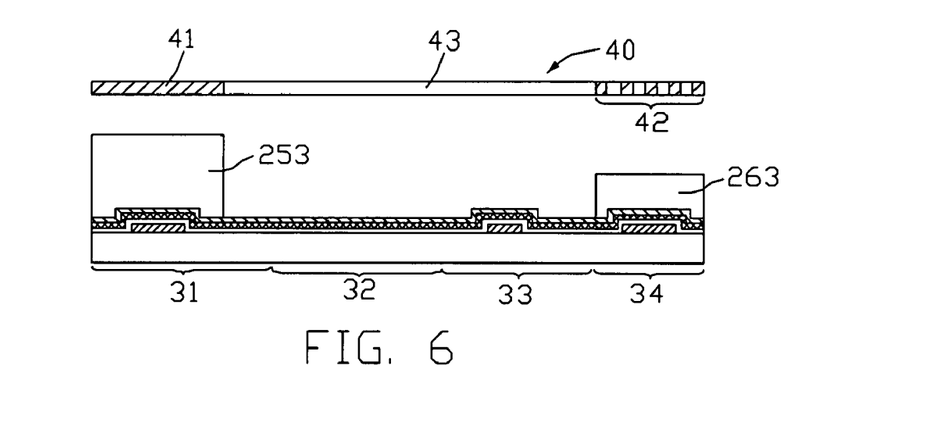

In step S4, referring also to FIG. 6, a second photo mask 40 such as a slit mask having a light shield area 41, a slit area 42, and a transparent area 43 is provided. The second photo-resist layer is exposed using the second photo mask 40 such that the light shield area 41 is opposite to the TFT area 31, the transparent area 43 is opposite to the display area 32 and the capacitor area 33, and the slit area 42 is opposite to the layout area 34. Then the exposed second photo-resist layer is developed, thereby forming a second photo-resist pattern. A first thickness of a first part 253 of the second photo-resist layer at the TFT area 31 is greater than a second thickness of a second part 253 of the second photo-resist layer at the layout area 34.

Figure 7:
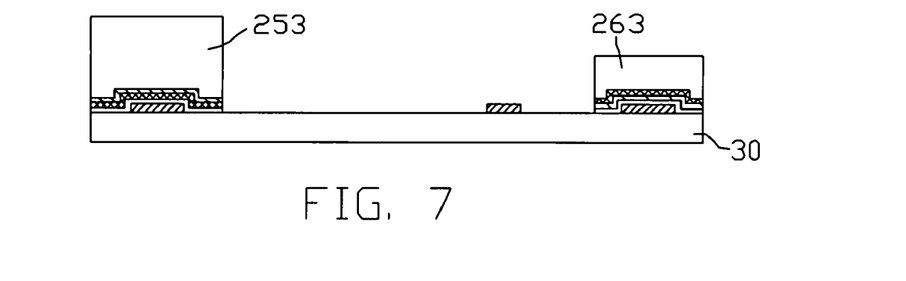

In step S5, referring also to FIG. 7, the doped amorphous silicon layer 205, the amorphous silicon layer 204 and the gate insulation layer 203 that are positioned at the display area 32 and the capacitor area 33 are etched using the second photo-resist pattern as a mask. The etchant is typically a nitric-hydrofluoric acid mixture.

Figure 8:
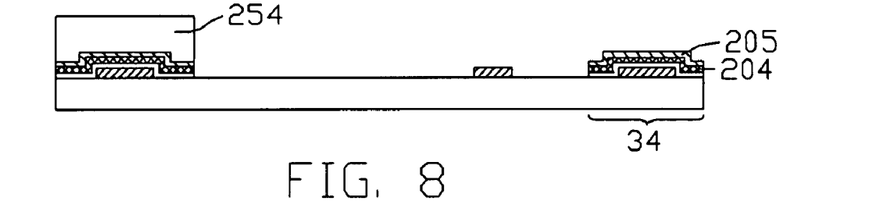

In step S6, referring also to FIG. 8, the second part 263 of the second photo-resist layer at the layout area 34 is removed by an ashing method. The first part 253 of the second photo-resist layer at the TFT area 31 is also partly removed by the ashing method, and is thereby transformed into a reduced thickness first part 254 of the second photo-resist layer. Reaction gases of the ashing method are oxygen or ozone.

Figure 9:
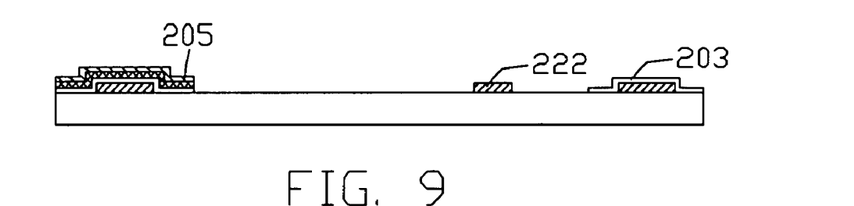

In step S7, referring also to FIG. 9, the doped amorphous silicon layer 205 and the amorphous silicon 204 at the layout area 34 are etched off. The reduced thickness first part 254 of the second photo-resist layer is removed by acetone. Thus, the doped amorphous silicon layer 205 and the amorphous silicon 204 at the layout area 34, the capacitor area 33, and the display area 32 are removed by a second photolithographic process.

Figure 10:
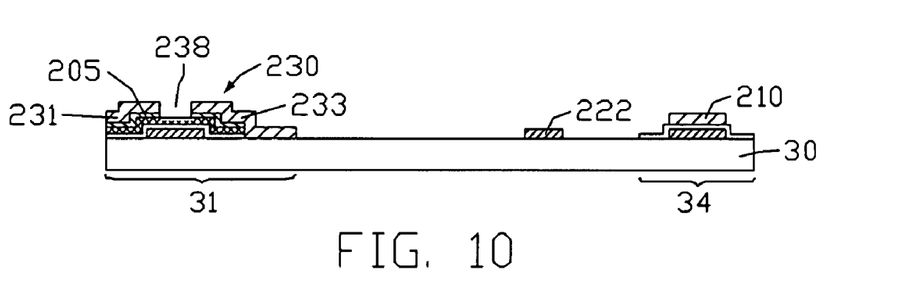

In steps S8 and S9, referring also to FIG. 10, a source/drain metal layer (not shown) is deposited on the substrate 30 having the doped amorphous silicon layer 205, the capacitor electrode 222 and the gate insulating layer 203 formed thereon. A third photo-resist layer (not shown) is formed on the source/drain metal layer. The third photo-resist layer is exposed using a third photo mask, and then is developed. Thereby, a third photo-resist pattern is formed. The source/drain metal layer is etched by wet etchant, using the third photo-resist pattern as a mask. Thereby, a source electrode 231 and a drain electrode 233 are formed at the TFT area 31, and a data line 210 is formed at the layout area 34. That is, the wet etchant only etches the source/drain metal layer. Furthermore, a portion of the doped amorphous silicon layer 205 below a gap between the source and drain electrodes 231, 233 is etched by a wet etching method. Thereby, a groove 238 is commonly defined in the gap between the source and drain electrodes 231, 233 and the doped amorphous silicon layer 205. Finally, residual portions of the third photo-resist pattern are removed. Thus, the source electrode 231, the drain electrode 233 and the data line 210 are formed by a third photolithographic process.

Figure 11:
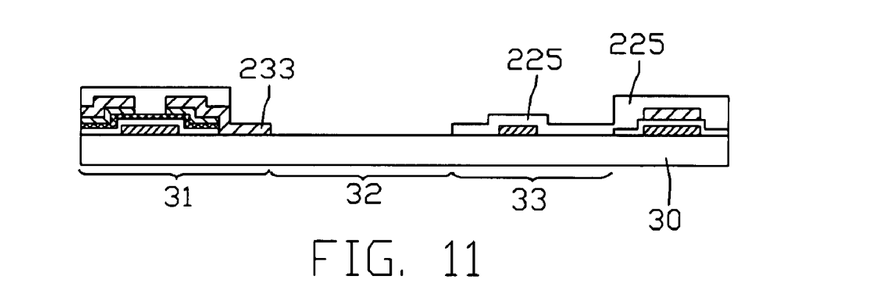

In steps S10 and S11, referring also to FIG. 11, a passivation layer 225 and a fourth photo-resist layer (not shown) are sequentially formed on the substrate 30 having the source electrode 231, the drain electrode 233, the capacitor electrode 222, and the data line 210 formed thereon. The fourth photo-resist layer is exposed using a fourth photo mask, and then is developed. Thereby, a fourth photo-resist pattern is formed. The passivation layer 225 is etched using the fourth photo-resist pattern as a mask. Thereby, a portion of the drain electrode. 233 adjacent to the display area 32 is exposed, and the substrate 30 at the display area 32 is exposed. A portion of the passivation layer 225 at the TFT area 31 remains, and a portion of the passivation layer 225 at the capacitor area 33 and the layout area 34 remains. Residual portions of the fourth photo-resist layer are removed. Thus, the substrate 30 at the display area 32 is exposed by a fourth photolithographic process.

Figure 12:
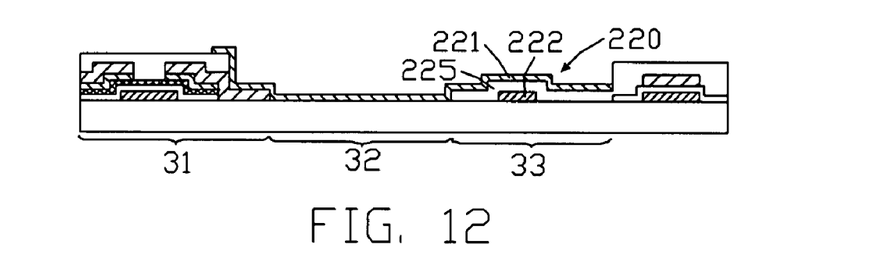

In steps S12 and S13, referring also to FIG. 12, a transparent metallic layer (not shown) and a fifth photo-resist layer (not shown) are sequentially formed on the substrate 30 having the drain electrode 233 and the passivation layer 225 formed thereon. The transparent metallic layer can for example be made of indium-tin oxide (ITO) or indium-zinc oxide (IZO). The fifth photo-resist layer is exposed using a fifth photo mask, and then is developed. Thereby, a fifth photo-resist pattern is formed. The transparent metal layer is etched using the fifth photo-resist pattern as a mask. Thereby, a pixel electrode 221 is commonly formed at part of the TFT area 31, the display area 32, and the capacitor area 33. Thus, the completed TFT array substrate 20 is finally obtained by a fifth photolithographic process.

The capacitor 220 includes the capacitor electrode 222, a corresponding portion of the pixel electrode 221, and the passivation layer 225 sandwiched between the two electrodes 222, 221. A capacitance $C_{ST}$ of the capacitor 220 can be calculated according to the following formula:

$$C_{sr} = \frac{\varepsilon \cdot A}{d}$$

In the formula, "∈" represents a dielectric constant of the passivation layer 225 between the capacitor electrode 222 and the pixel electrode 221. "A" represents an area of the capacitor electrode 222 opposite to the pixel electrode 221. "d" represents a distance between the capacitor electrode 222 and the pixel electrode 221, and is equal to a thickness of the passivation layer 225. According to the above formula, a capacitance of the capacitor 220 is proportional to the electrode area "A", and is inversely proportional to the distance "d".

The capacitor 220 does not include the amorphous silicon layer 204 and the doped amorphous silicon layer 205. Therefore the distance "d" between the capacitor electrode 222 and the pixel electrode 221 is dependent only upon a thickness of the passivation layer 225. The passivation layer 225 is formed by step S11 as described above. Therefore the thickness of the passivation layer 225 can easily be configured according to a desired predetermined capacitance $C_{ST}$ of the capacitor 220. Thus, when a capacitance of the capacitor 220 needs to be increased in order to improve the display quality of an LCD having the TFT array substrate 20, the distance "d" between the capacitor electrode 222 and the pixel electrode 221 of the capacitor 220 can be easily reduced instead of increasing the electrode area "A". In this way, a high aperture ratio of the TFT array substrate 20 can be maintained while still improving the display quality of the LCD having the TFT array substrate 20.

It is to be understood, however, that even though numerous characteristics and advantages of the present embodiments have been set out at the foregoing description, together with details of structures and functions relating to the embodiments, the disclosure is illustrative only, and changes may be made in detail, especially in matters of shape, size, and arrangement of parts and processes within the principles of the invention to the full extent indicated by the broad general meaning of the terms in which the appended claims are expressed.

What is claimed is:

1. A method for manufacturing a thin film transistor (TFT) array substrate, comprising:
    providing an insulating substrate comprising a TFT area, a display area, and a capacitor area;
    forming a gate electrode at the TFT area and a capacitor electrode at the capacitor area through a first photolithographic process;
    forming an insulating layer, an amorphous silicon layer, and a doped amorphous silicon layer in turn on the insulating substrate;
    etching the doped amorphous silicon, the amorphous silicon and the insulating layer at the display area and the capacitor area through a second photolithographic process;
    forming a source electrode and a drain electrode at the TFT area through a third photolithographic process;
    forming a passivation layer at the capacitor area through a fourth photolithographic process; and
    forming a pixel electrode on the substrate through a five photolithographic process, the pixel electrode covering the display area, the capacitor area, and part of the TFT area, the capacitor electrode, the pixel electrode and the passivation layer between the two electrodes cooperatively defining a capacitor.

2. The method as claimed in claim 1, wherein the insulating substrate is a glass substrate.

3. The method as claimed in claim 1, wherein the second photolithographic process comprises: providing a slit mask having a light shield area, a slit area, and a transparent area; using the slit mask to collimate a photo-resist layer such that the light shield area is opposite to the TFT area, the transparent area is opposite to the display area and the capacitor area, and the slit area is opposite to the layout area.

4. The method as claimed in claim 3, wherein the second photolithographic process further comprises: exposing the photo-resist layer, and developing the photo-resist layer to form a predetermined pattern such that a first thickness of a first part of the predetermined pattern at the TFT area is greater than a second thickness of a second part of the predetermined pattern at the layout area.

5. The method as claimed in claim 4, wherein the second photolithographic process further comprises: removing the second part of the photo-resist layer at the layout area by an ashing method while removing only part of the first part of the photo-resist layer at the TFT area by the ashing method.

6. The method as claimed in claim 1, wherein the insulating substrate further comprises a layout area.

7. The method as claimed in claim 1, wherein the third photolithographic process further comprises forming a data line at the layout area of the insulating substrate.

8. The method as claimed in claim 1, wherein the insulating layer is made of silicon nitride ($Si_3N_4$).

9. The method as claimed in claim 8, wherein the insulating layer is deposited by a chemical vapor deposition (CVD) method.

10. The method as claimed in claim 1, wherein the second photolithographic process comprises a wet etching method using a nitric-hydrofluoric acid mixture.

11. The method as claimed in claim 1, wherein the third photolithographic process comprises a wet etching method that only etches the source/drain metal layer.

12. A method for manufacturing a thin film transistor (TFT) array substrate, comprising:
    depositing a gate metal layer and a first photo-resist layer;
    at each of pixel regions, forming a gate electrode at a TFT area of the pixel region, a capacitor electrode at a capacitor area of the pixel region, and a gate line at a layout area of the pixel region;
    forming an insulating layer, an amorphous silicon layer, and a doped amorphous silicon layer;
    forming a second photo-resist layer, which at each of the pixel regions has a first thickness at a first part thereof at the TFT area and a second thickness at a second part thereof at the layout area;
    etching the doped amorphous silicon layer, the amorphous silicon layer, and the insulating layer at a display area and the capacitor area of each of the pixel regions;
    removing the second photo-resist layer;
    etching the doped amorphous silicon layer and the amorphous silicon layer at the layout area of each of the pixel regions;
    depositing a source/drain metal layer;
    forming a source electrode and a drain electrode at the TFT area of each of the pixel regions, and forming a data line at the layout area of each of the pixel regions;
    depositing a passivation layer at the capacitor area of each of the pixel regions;
    depositing a transparent metallic layer; and
    forming a pixel electrode of each of the pixel regions, wherein at each of the pixel regions, the capacitor electrode, the pixel electrode, and the passivation layer between the two electrodes cooperatively define a capacitor.

13. The method as claimed in claim 12, wherein the transparent metallic layer is made of indium-tin oxide (ITO).

14. The method as claimed in claim 12, wherein the transparent metallic layer is made of indium-zinc oxide (IZO).

15. The method as claimed in claim 12, wherein the insulation layer is made of silicon nitride ($Si_3N_4$).

* * * * *